July 31, 1962
D. H. DESTY ETAL
3,046,699
PROCESS FOR PRODUCING GLASS HELICES
Filed Sept. 29, 1959
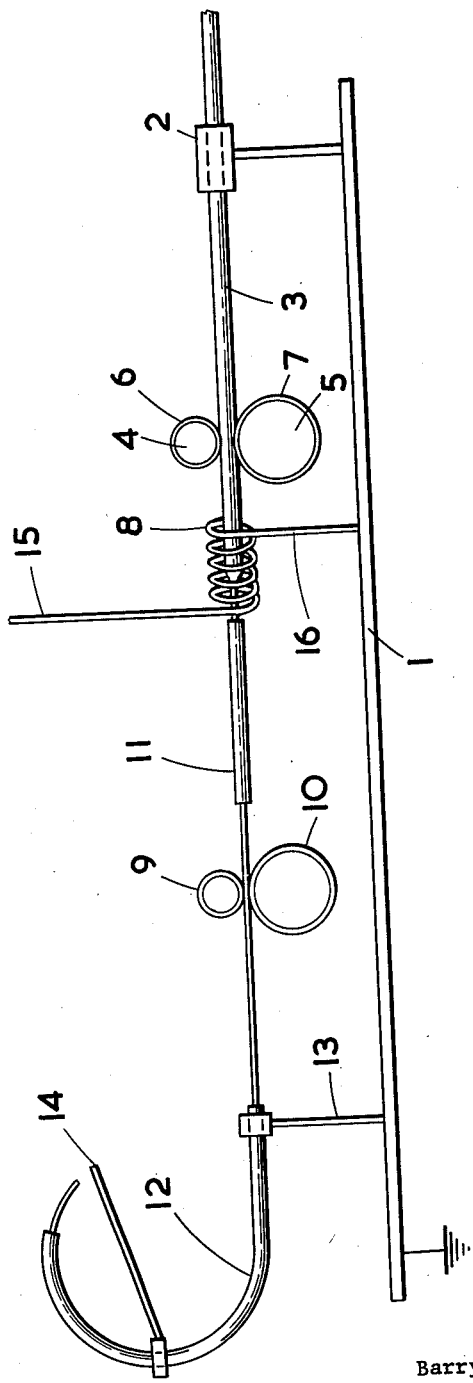
INVENTORS:
Denis Henry Desty
John Norman Haresnape
Barry Herbert Francis Whyman
By *Morgan, Finnegan, Durham & Pine*
Attorneys 3,046,699
PROCESS FOR PRODUCING GLASS HELICES
Denis Henry Desty, John Norman Haresnape, and Barry Herbert Francis Whyman, all of Sunbury-on-Thames, England, assignors to The British Petroleum Company Limited, London England, a joint-stock corporation of Great Britain
Filed Sept. 29, 1959, Ser. No. 843,189
Claims priority, application Great Britain Apr. 9, 1959
6 Claims. (Cl. 49—34)

This invention relates to novel helices of glass or quartz, to a process and to apparatus for their production and to apparatus comprising said helices.

According to one aspect of this invention there is provided a helix made of a glass or quartz tubular filament of circular cross-section, the filament having an external diameter less than 5 mm., preferably less than 1 mm.

Preferably the diameter of the helix lies in the range 1 to 20 cms. Preferably also, the ratio of the helix diameter to the external diameter of the filament is greater than 20.

According to another aspect of this invention there is provided apparatus, for forming a helix of glass or quartz, comprising (a) a heating tube, wherein, in use, a fine-diameter straight tube or rod of glass or quartz is softened, (b) a setting tube, curved to the arc of a circle, in which, in use, the softened fine-diameter tube or rod of glass or quartz is cooled and set to shape, and (c) a pair of rollers, at least one being driven, for continuously feeding said fine diameter straight tube or rod of glass or quartz into said heating tube.

According to another aspect of this invention there is provided a process, for the production of helices of glass or quartz, which comprises passing a fine diameter straight tube or rod of glass or quartz into a heating tube to soften said straight tube or rod and thereafter passing the softened tube or rod into a setting tube, curved to the arc of a circle, maintained at a temperature such that the softened tube or rod is set to shape, whereby a helix is cooled and formed.

Conveniently, in the apparatus and process described, a single tube referred to as the "bending tube" is employed for the softening and setting stages; a section of the bending tube will be heated to constitute a softening section wherein the straight tube or rod is softened and another section of the bending tube will be maintained at lower temperature to constitute a setting section wherein the softened tube or rod is cooled and set to shape. The temperature of the setting section may be maintained either by imposed cooling or by natural cooling, that is, by radiation and/or convection.

Suitably the softening section consists of a straight entry section followed by a section curved to the arc of a circle.

Preferably the bending tube is a metal tube, suitably of copper, brass, iron, nickel or nickel chromium alloys.

In practice, it has been found convenient to continuously form the fine diameter straight tube or rod from straight tube or rod of stock diameter, by heating and drawing. For this reason the above-mentioned rollers which continuously feed the fine-diameter straight tube or rod into the heating tube, will be referred to as "draw rollers." Thus the apparatus may comprise, additionally, a pair of feed rollers disposed in back of the draw rollers and adapted to be driven at lower speed than the draw rollers, and a drawing-heating zone situated between the feed rollers and the draw rollers.

In use, a length of rod or tubing, usually of stock diameter, is continuously fed between the feed rollers and heated in the drawing-heating zone, and fine rod or tubing is drawn from the length fed, by the action of the draw rollers. The fine rod or tubing is then continuously fed into the softening section and subsequently into the setting section of the bending tube, whereby a helix is formed. If desired, by glass blowing, a second length of rod or tubing may be attached to the rearward end of the first length, that is, to the end which is back of the feed rollers, while the forming process continues. In this manner, by successive additions of further lengths of rod or tubing, helices of any desired length may be constructed.

Suitably all heating is carried out electrically. When using a bending tube made of metal, the softening section may be constituted by the section between electrical connections to this tube, the section being heated by passing a high amperage current through this metal tube.

The apparatus is particularly suitable for the production of glass helices from stock capillary tubing, for example, tubing having an external diameter of 0.25 inch and an internal diameter of 0.025 inch.

Soda or heat resisting glass, for example, Pyrex, may be employed. Pyrex is a registered trademark. The apparatus may also be employed for the production of quartz helices; by reason of the higher temperatures required, special heating elements should be used; an alloy of 10% rhodium platinum is suitable.

Glass capillary helices, formed in accordance with the invention, have been found to be suitable for use as chromatographic "columns."

According to a further aspect of this invention there is provided chromatographic separation apparatus comprising a glass capillary helix as hereinbefore described having one end connected to a chromatographic detector, known per se. Preferably the helix has a filament internal diameter of 0.025 to 1 mm. Suitably the helix has a diameter of 5 to 15 cms. and an overall length of 1 to 500 metres.

The invention is illustrated but in no way limited with reference to the accompanying drawing.

With reference to the drawing:

A metal base plate 1 electrically grounded to earth carries a tubular support 2 for the original thick-walled stock-diameter glass tube 3. The leading end of the tube 3 is fed through double feed rollers 4 and 5; the lower roller is driven by a geared motor (not shown) at a constant speed which can be adjusted up to 5 rev./hr. The rollers 4 and 5 are equipped, respectively, with rubber tires 6 and 7. The smaller upper roller 4 is free to rotate and is maintained under light pressure on the glass tube 3 which is fed at a fraction of an inch per minute into a small furnace, consisting of a few turns of nichrome resistance tape 8 (⅛ inch by 0.024 inch) close-wound in two layers in the form of a small helix about 1 inch long and 0.5 inch in diameter and arranged horizontally on a support post 16 at the same height as the glass tube. The furnace is heated directly by passing an electric current from a low voltage transformer (not shown) through lead 15, tape 8 and earth return by post 16. The furnace is heated to a temperature in the range from dull red to bright red heat (450° C.–600° C.) appropriate to the particular glass being drawn. With the dimensions given the power required for a high melting glass will not usually be more than 400 watts at about 5 volts.

The capillary is drawn to fine diameter by a pair of draw rollers 9 and 10 similar, respectively, to feed rollers 4 and 5. The lower roller 10 is driven at speeds in the range 60 to 300 revs./hr. The cross section of the original tube is therefore reduced by the ratio between the speeds of these two pairs of rollers, i.e. the draw factor. A horizontal porcelain tube 11 (3 inches long, ³⁄₁₆ inch O.D. and ⅛ inch I.D.) is placed between the furnace and the draw rollers so that the hot capillary passes through it.

This reduces the heat lost from the capillary as it leaves the furnace and a small fraction of the drawing action takes place within it. This results in improved uniformity.

The fine-diameter straight capillary issuing from the draw rollers 9 and 10, now moving at a few inches per minute, is forced into the bending tube 12, which is formed from a stainless steel tube (ca. 9 inches long, 5/32 inch O.D. and 3/32 inch I.D.). This tube has been formed to an arc of a circle of a diameter, corresponding to the diameter of the required helices, and has a short straight section at the entry end. It is mounted vertically on a post 13 with the curved section uppermost so that the straight entry end is level with the opposed rim portions of the draw rollers. An electric current from a low voltage transformer (not shown) is passed, by lead 14 connected to the curved section, with earth return by post 13 and base plate 1, through the straight entry section and the lower part of the curved section, whereby the straight entry section and the lower part of the curved section of the tube is employed as a heater, and the temperature adjusted so that the capillary just softens. The power requirements will not usually exceed 200 watts at about 2 volts. The upper part of the curved section of the tube 12 is unheated and constitutes a cool zone within which the fine-diameter capillary tubing becomes rigid and appears at the exit of the bending tube as a close wound helix. This is collected on a rotating rod (not shown) positioned with its axis parallel to the arranged axis of the helix, i.e. at right angles to the plane of the bending tube.

To start the apparatus a length of fine diameter capillary is drawn by hand from one end of the thick capillary tubing used as feed material. This tubing with fine capillary attached is inserted into the apparatus with the point at which the major reduction in diameter occurs inside the furnace. The heating currents are then switched on, followed, after a suitable delay, by the roller motors. The furnace and roller speeds may be adjusted to give capillary of the required size while the bending tube is by-passed, and the temperature of the latter may be checked by manual insertion of a short length of straight capillary. The drawn capillary tube is then broken off as it emerges from the draw rollers and the broken end guided into the bending tube as it is pushed forward by the rollers.

Once started the apparatus usually functions without further adjustment for several hours and the total length of capillary produced in one piece is limited only by the length of the original tube. Thus a standard five foot length of thick-walled tube (6 mm. O.D., 2 mm. I.D.) gives about 250 feet of approximately 0.007 inch I.D. capillary having an outer diameter of about 0.04 inch, using a draw factor of 50. Greater lengths than this can be successfully produced by glass blowing additional tubes on to this original tube during the drawing operation.

The invention is further illustrated but not limited with reference to the following example.

*Example*

A thick-wall "Pyrex" tube was drawn using the apparatus described with reference to the drawing. Two different draw factors were employed to give 50 foot lengths of capillary coiled into helices with a diameter of 4 inches. The outer diameter of the original and two capillaries were measured with a micrometer and their bores were measured with a microscope. Results obtained were as shown in the following table.

TABLE

| | External Diameter (E) (inch) | Internal Diameter (I) (inch) | E/I | Reduction Factor (on Diameter) | Approx. Draw Factor |
|---|---|---|---|---|---|
| Original Tube | 0.249 | 0.0258 | 9.7 | | |
| Capillary A | 0.0355 | 0.0031 | 11.4 | [1] 8.3 [2] 7.0 | 50 |
| Capillary B | 0.031 | 0.0024 | 12.9 | [1] 10.7 [2] 8.0 | 60 |

[1] Int. [2] Ext.

We claim:

1. A process for the production of filaments of vitreous material in helical form which comprises causing a filament of vitreous material to advance successively through a softening zone, a shaping zone and a setting zone; confining said filament in its advance through said softening zone to a rectilinear path while supplying heat to said filament in said path at a rate to heat it to a temperature at which it is in a softened state; confining the softened filament in its advance through said shaping zone to a curvilinear path shaped to an arc of a circle while supplying heat to the softened filament in its advance along said curvilinear path, to maintain the softened filament at a temperature at which it remains in said softened state, such that the softened filament is caused to conform to the shape of said curvilinear path; and confining the shaped filament in its advance through said setting zone to a curvilinear path shaped to an arc of the same circle while cooling the advancing shaped filament in said last mentioned path to a temperature at which it is set to shape.

2. A process according to claim 1 wherein the vitreous material is glass.

3. A process according to claim 1 wherein the vitreous material is quartz.

4. A process according to claim 1 wherein the filament is produced having an external diameter of less than 5 mm.

5. A process according to claim 4 wherein the filament is produced having an external diameter of less than 1 mm.

6. A process according to claim 1 for the production of filaments of vitreous material in helical form, which process also includes the step of heating and drawing an advancing cylinder of vitreous material to a smaller-diameter advancing filament of said material, and then feeding said smaller-diameter advancing filament, while still in its heated state, to said softening zone as the filament of vitreous material which is caused to advance successively through said softening zone, said shaping zone and said setting zone.

References Cited in the file of this patent
UNITED STATES PATENTS

| 1,482,455 | Berry | Feb. 5, 1924 |
| 1,534,685 | Claude et al. | Apr. 21, 1925 |
| 2,021,276 | Weinhart | Nov. 19, 1935 |
| 2,208,958 | Brown et al. | July 23, 1940 |
| 2,210,164 | Bristol | Aug. 6, 1940 |
| 2,363,140 | Persons | Nov. 21, 1944 |
| 2,504,426 | Keyzer | Apr. 18, 1950 |
| 2,523,015 | Greiner | Sept. 19, 1950 |
| 2,528,528 | Lyon | Nov. 7, 1950 |
| 2,613,479 | Stong | Oct. 14, 1952 |
| 2,711,055 | Majkrzak | June 21, 1955 |
| 2,920,478 | Golay | Jan. 12, 1960 |